(12) United States Patent  
Blankinship (10) Patent No.: US 7,166,251 B2
(45) Date of Patent: Jan. 23, 2007

(54) SEGMENTED FLEXIBLE BARREL LAY-UP MANDREL

(75) Inventor: Bruce C. Blankinship, Mount Vernon, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 10/904,841

(22) Filed: Dec. 1, 2004

(65) Prior Publication Data

US 2006/0145049 A1 Jul. 6, 2006

(51) Int. Cl.
B29C 70/44 (2006.01)

(52) U.S. Cl. .................. 264/258; 264/313; 264/334; 425/392; 425/441

(58) Field of Classification Search .............. 244/119, 244/120, 123.1; 296/181.2; 29/17.3, 411, 29/566, DIG. 8; 264/258, 313, 324, 334; 425/392, 441

See application file for complete search history.

(56) References Cited

U.S. PATENT DOCUMENTS

| | | | | |
|---|---|---|---|---|
| 3,616,062 A | * | 10/1971 | Anderson | 156/432 |
| 3,853,656 A | * | 12/1974 | McNeely et al. | 156/172 |
| 4,086,378 A | * | 4/1978 | Kam et al. | 428/34.5 |
| 4,230,293 A | * | 10/1980 | Hamm et al. | 244/119 |
| 4,278,485 A | * | 7/1981 | Hamm et al. | 156/173 |
| 4,310,132 A | * | 1/1982 | Frosch et al. | 244/119 |
| 4,401,495 A | * | 8/1983 | McKinney | 156/173 |
| 4,459,171 A | * | 7/1984 | McKinney | 156/425 |
| 4,463,044 A | * | 7/1984 | McKinney | 428/107 |
| 4,512,836 A | * | 4/1985 | Tucci | 156/174 |
| 4,674,712 A | * | 6/1987 | Whitener et al. | 244/119 |
| 5,022,845 A | * | 6/1991 | Charlson et al. | 425/403 |
| 5,024,399 A | * | 6/1991 | Barquet et al. | 244/119 |
| 5,125,993 A | * | 6/1992 | Principe | 156/155 |
| 5,170,967 A | * | 12/1992 | Hamamoto et al. | 244/119 |
| 5,200,251 A | * | 4/1993 | Brand | 428/156 |
| 5,223,067 A | * | 6/1993 | Hamamoto et al. | 156/173 |
| 5,259,901 A | * | 11/1993 | Davis et al. | 156/154 |
| 5,266,137 A | * | 11/1993 | Hollingsworth | 156/156 |
| 5,651,850 A | * | 7/1997 | Turner et al. | 156/171 |
| 5,701,651 A | * | 12/1997 | Groves et al. | 29/281.5 |
| 6,098,926 A | * | 8/2000 | Morgenthaler | 244/119 |
| 6,149,856 A | * | 11/2000 | Zemel et al. | 264/401 |
| 6,458,309 B1 | * | 10/2002 | Allen et al. | 264/319 |
| 6,475,320 B1 | * | 11/2002 | Masugi | 156/189 |
| 6,511,570 B1 | * | 1/2003 | Matsui | 156/245 |

(Continued)

Primary Examiner—Teri Pham Luu
Assistant Examiner—Edward J. Mayle
(74) Attorney, Agent, or Firm—Ostrager Chong Flaherty & Broitman P.C.

(57) ABSTRACT

An aircraft barrel lay-up assembly is provided comprising a barrel mandrel assembly having a contiguous outer barrel lay-up surface. A minor barrel outer surface element is movable between a minor barrel engaged position and a minor barrel disengaged position and forms a minority portion of the contiguous outer barrel lay-up surface when in the engaged position. A major barrel outer surface element is movable between a major barrel engaged position and a major barrel disengaged position. The major barrel outer surface has a first major barrel surface end and a second major barrel surface end moving together to reduce an effective major barrel outer surface circumference when in the major barrel disengaged position. A composite ply assembly is formed around the barrel mandrel circumference and cured while coincident to form a composite barrel element. The composite barrel element removable from said barrel mandrel assembly by way of moving major barrel outer surface element into the major barrel disengaged position such that a sliding gap is formed.

42 Claims, 7 Drawing Sheets

U.S. PATENT DOCUMENTS

| | | | |
|---|---|---|---|
| 6,648,273 B1 * | 11/2003 | Anast | 244/119 |
| 6,692,681 B1 * | 2/2004 | Lunde | 264/510 |
| 6,719,865 B1 * | 4/2004 | Kasahara et al. | 156/184 |
| 2002/0056788 A1 * | 5/2002 | Anderson et al. | 244/119 |
| 2003/0080251 A1 * | 5/2003 | Anast | 244/119 |
| 2004/0188025 A1 * | 9/2004 | Anderson et al. | 156/382 |
| 2004/0216805 A1 * | 11/2004 | Teufel | 141/11 |
| 2005/0023414 A1 * | 2/2005 | Braun | 244/120 |
| 2005/0039842 A1 * | 2/2005 | Clark et al. | 156/173 |
| 2005/0039843 A1 * | 2/2005 | Johnson et al. | 156/175 |
| 2005/0039844 A1 * | 2/2005 | Engwall et al. | 156/180 |
| 2005/0102814 A1 * | 5/2005 | Anderson et al. | 29/455.1 |
| 2005/0211843 A1 * | 9/2005 | Simpson et al. | 244/119 |
| 2006/0060325 A1 * | 3/2006 | Gordon et al. | 164/98 |
| 2006/0096700 A1 * | 5/2006 | Clark et al. | 156/195 |

* cited by examiner

SEGMENTED FLEXIBLE BARREL LAY-UP MANDREL

TECHNICAL FIELD

The present invention relates generally to an aircraft barrel lay-up mandrel assembly and more particularly to an aircraft barrel lay-up assembly with improved composite ply removal features.

BACKGROUND OF THE INVENTION

Aircraft components and structural members come in a wide variety of complex shapes and sizes. Weight and strength considerations have led to construction technologies such as composite ply lay-up methodologies. In such methodologies, epoxy infused materials are layed up onto mandrels or similar structures and then subjected to curing procedures. Once cured, the composite plies are then removed. Although this procedure is well known and understood, it can generate significant challenges for the fabrication of components with complex shapes.

Such is the case with barrel shaped components. Components such as fuselage skins and stringers must commonly be laid up on complex mandrels composed of multiple rigid segments prior to curing. Once cured, these segments must be dismantled and removed in order to remove the composite barrel structure from the mandrel. Aircraft dimensional proportions, however, dictate that these rigid segments become heavy and commonly require large handling equipment to disassemble. Often design of these structures requires personnel to climb inside the mandrel to unfasten retaining bolts and guide the heavy equipment. This is highly undesirable as a host of time consuming and hazardous procedures must be implemented. Present mandrel configurations, therefore, contribute negatively to the production flow timing.

In addition, the multiple rigid segments utilized in present designs result in a plurality of joints, each of which representing a potential source of vacuum leaking. Vacuum leaks can result in defects in the laminate and possible scraping of the resultant part. Thus considerable time must be expelled to insure proper assembly and disassembly of the mandrel to insure proper joint sealing and to insure joint regions do not experience damage during disassembly.

It would therefore be highly desirable to have an aircraft barrel lay-up assembly that reduced the time and complexity of resultant composite component removal. It would additionally be highly desirable to have an aircraft barrel lay-up assembly that minimized the number of sealing joints so as to simplify joint sealing prior to vacuum applications.

SUMMARY OF THE INVENTION

It is therefore an object to the present invention to provide an aircraft barrel lay-up assembly with improved composite component removal procedures. It is further object of the present invention to provide an aircraft barrel lay-up assembly with improved joint sealing characteristics.

In accordance with the objects of the present invention an aircraft barrel lay-up assembly is provided comprising a barrel mandrel assembly having a contiguous outer barrel lay-up surface. A minor barrel outer surface element is movable between a minor barrel engaged position and a minor barrel disengaged position and forms a minority portion of the contiguous outer barrel lay-up surface when in the engaged position. A major barrel outer surface element is movable between a major barrel engaged position and a major barrel disengaged position, The major barrel outer surface has a first major barrel surface end and a second major barrel surface end moving together to reduce an effective major barrel outer surface circumference when in the major barrel disengaged position. A composite ply assembly is formed around the barrel mandrel circumference and cured while coincident to form a composite barrel element. The composite barrel element removable from said barrel mandrel assembly by way of moving major barrel outer surface element into the major barrel disengaged position such that a sliding gap is formed.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
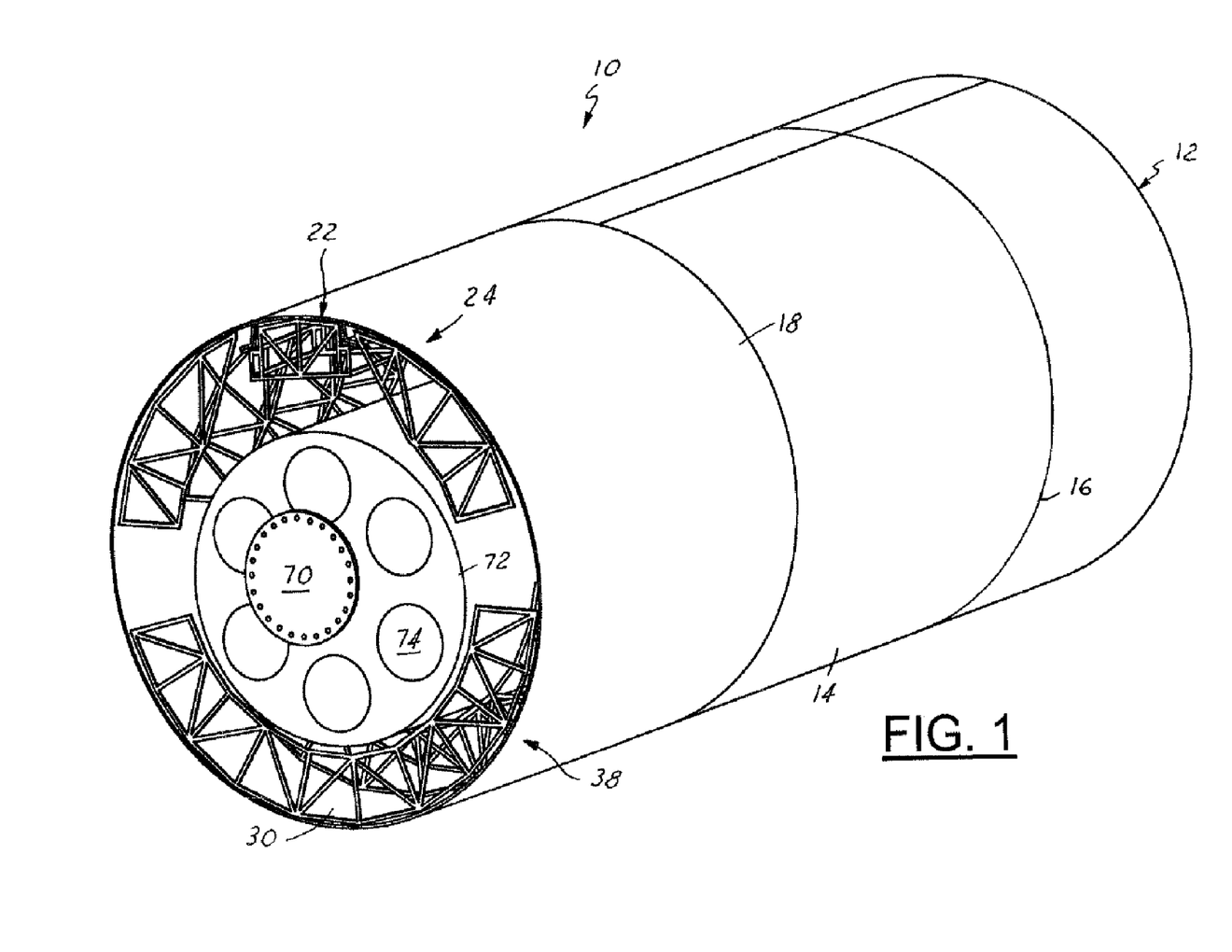
FIG. 1 is an illustration of an aircraft barrel lay-up assembly in accordance with the present invention, the aircraft barrel lay-up assembly illustrated in the major barrel engaged position.
Figure 2:
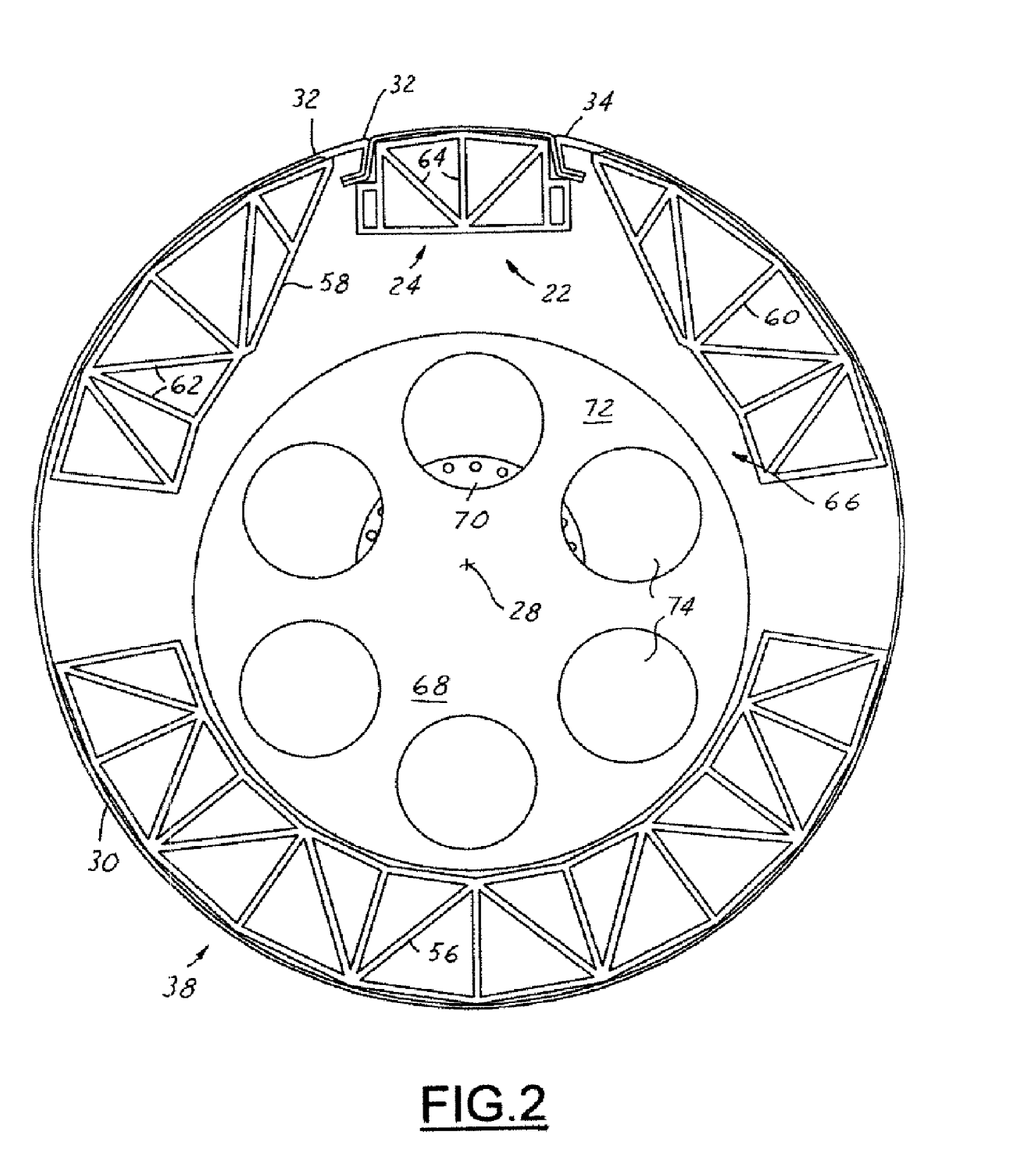
FIG. 2 is a end view illustration of the aircraft barrel lay-up assembly illustrated in FIG. 1.
Figure 3:
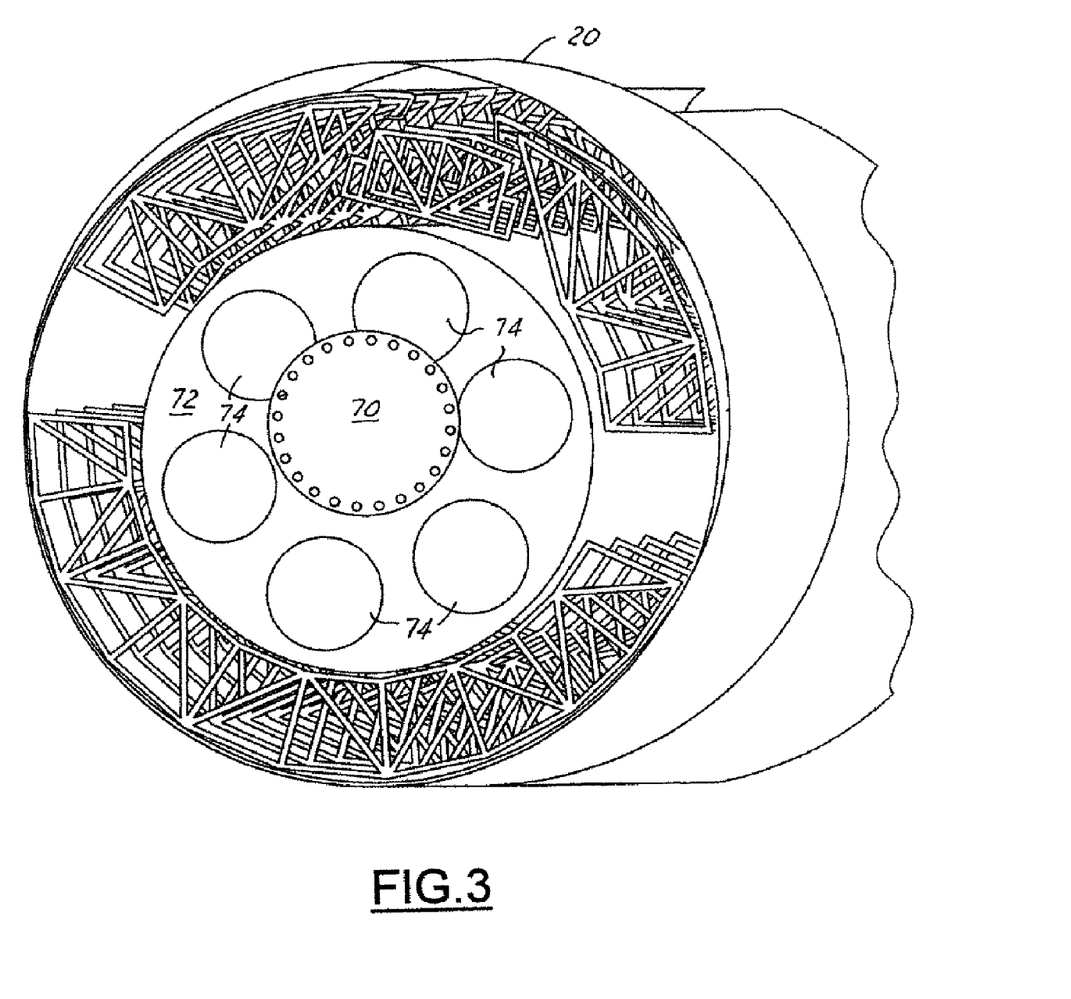
FIG. 3 is a detailed illustration of the aircraft barrel lay-up assembly illustrated in FIG. 1, the detail illustrating the minor barrel outer surface element moving into the minor barrel disengaged position.

Referring now to FIGS. 1 through 3, which are illustrations of an aircraft barrel lay-up assembly 10 in accordance with the present invention. The barrel lay-up assembly 10 includes a barrel mandrel assembly 12 with a contiguous outer barrel lay up surface 14 having a barrel mandrel circumference 16. A composite ply assembly 18 is laid up onto the contiguous outer barrel lay-up surface 14 and cured to generate a composite barrel element 20. The present invention provides a unique apparatus and method to generate the contiguous outer barrel lay-up surface 14 and remove the composite barrel element 20 from the barrel mandrel assembly 12.

Figure 4:
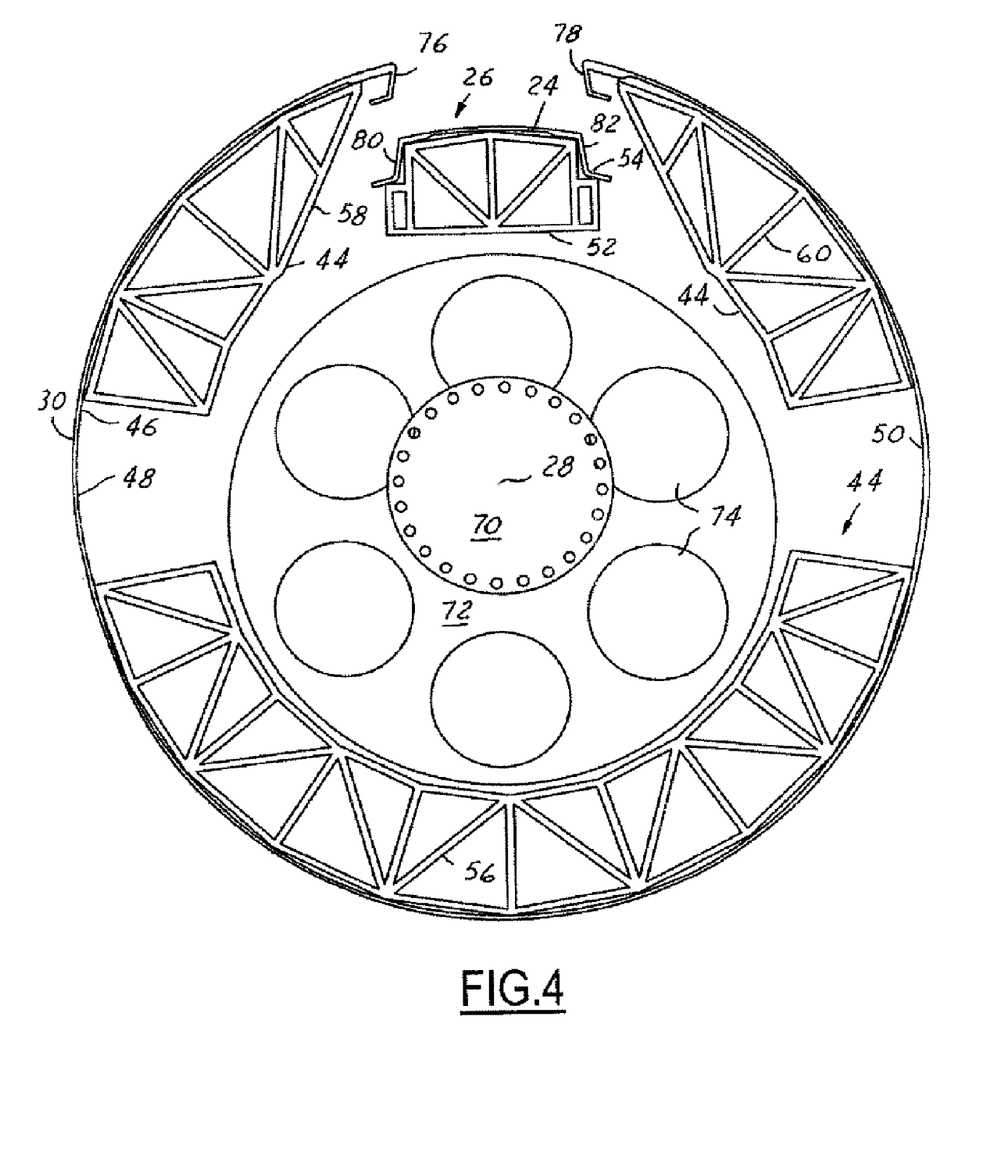
FIG. 4 is a detail illustration of the aircraft barrel lay-up assembly illustrated in FIG. 3, the detail illustrating the barrel mandrel assembly without the composite ply lay-up.

The barrel mandrel assembly 12 is actually comprised of a minor barrel outer surface element 22 representing approximately 20 percent of the barrel mandrel circumference 16 or an otherwise minority portion. The minor barrel outer surface element 22 is movable between a minor barrel engaged position 24 and a minor barrel disengaged position 26. The minor barrel outer surface element 22 is contiguous with the contiguous outer barrel lay up surface 14 when in the minor barrel engaged position 24 and moves inward towards a barrel mandrel center point 28 when in said minor barrel disengaged position 26 (see FIG. 4).

The barrel mandrel assembly 12 further includes a major barrel outer surface element 30 representing approximately 80 percent of the barrel mandrel circumference 16 or an otherwise majority portion. The major barrel outer surface element 30 includes a first major barrel surface end 32 and a second major barrel, surface end 34 generating an effective major barrel outer surface circumference. What is meant by effective circumference is that if an imaginary spline connected the first major barrel surface end 32 to the second major barrel surface end 34, the resulting major barrel outer surface 30 along wit the imaginary spline would constitute an effective circumference. The major barrel outer surface element 30 is movable between a major barrel engaged position 38 and a major barrel disengaged position 40. In the major barrel engaged position 38, the major barrel outer surface element 30 is contiguous with the contiguous outer barrel lay-up surface 14. In the major barrel disengaged position 40, the first and second major barrel surface ends 32,34 move toward one another and thereby reduce the effective major barrel outer surface circumference to generate a sliding gap 42 between the barrel mandrel assembly 12 and the composite ply assembly 18 (see FIG. 5). It is contemplated that the major barrel outer surface element 30 will move into the major barrel disengaged position 40 in response to the minor barrel outer surface 22 moving into the minor barrel disengaged position 26. The major barrel outer surface element 30 may even be biased towards the disengagement position 40.

Although the major barrel outer surface element 30 may be designed in a variety of fashions, one embodiment contemplates the use of a plurality of major barrel stiffener elements 44 mounted to a major barrel inner surface 46. The stiffener elements 44 are absent in at least two locations to generate a first flex zone portion 48 and a second flex zone portion 50 allowing the major barrel outer surface element 30 to flex inwards to decrease the effective major barrel outer surface circumference. A minor barrel stiffener element 52 may also be affixed to the minor barrel inner surface 54 to prevent flex in the minor barrel outer surface element.

The plurality of major barrel stiffener elements 44 may be specifically comprised of a base stiffener element 56 running along the major barrel inner surface 46 from the first flex zone portion 48 to the second flex zone portion 50. A first upper stiffener element 58 may similarly run from the first flex zone portion 48 to the first major barrel surface end 32. A second upper stiffener element 60 may similarly run from the second flex zone portion 50 to the second major barrel surface end 34. The plurality of major barrel stiffener elements 44 is preferably a plurality of major barrel truss elements 62 and a minor barrel truss element 64 leaving a hollow mandrel center 66. A rotatable center support structure 68 is mounted within the hollow mandrel center 66 and is preferably affixed to the major barrel outer surface element 30 by way of mounting to the base stiffener element 56. The rotatable center support structure 68 includes a rotational support mount 70 located at the barrel mandrel center point 28 such that the entire barrel mandrel assembly 12 may be rotated about the center point 28 during lay-up of the composite ply assembly 18. Although a variety of center support structures 68 are contemplated, one embodiment contemplates a rotatable center support barrel 72 including a plurality of air conducting chambers 74 to allow even heating and cooling of the composite ply assembly 18.

The major barrel outer surface element 22 preferably also includes a first major barrel flange 76 and a second major barrel flange 78 located at the first major barrel surface end 32 and second major barrel surface end 34 respectively. They are preferably inwardly angles flanges adapted to engage a first minor barrel flange 80 and a second minor barrel flange 82 respectively such that as the minor barrel outer surface element 22 moves upwards into the minor barrel engaged position, the respective flanges engage and the minor barrel outer surface element 22 pushes the major barrel outer surface element 30 into the major barrel engaged position 30. By biasing the major barrel outer surface element 30 into the major barrel disengaged position 40, complete control of the barrel mandrel assembly 12 can be effected by simple movement of the minor barrel outer surface element 22. In addition, the flanges reduce the chance of leakage during vacuum processing.

Figure 5:
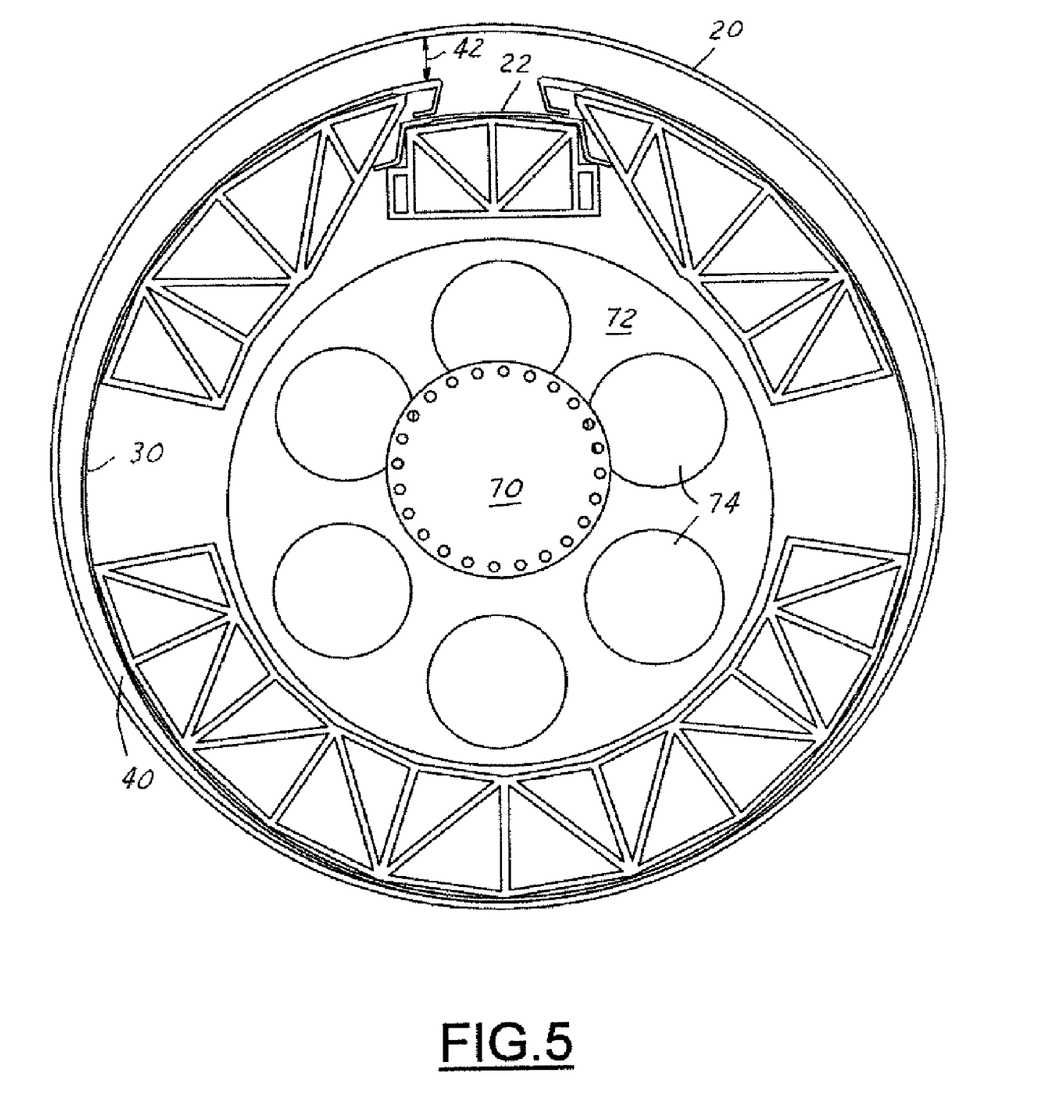
FIG. 5 is an end-view illustration of the aircraft barrel lay-up assembly illustrated in FIG. 3.
Figure 6:
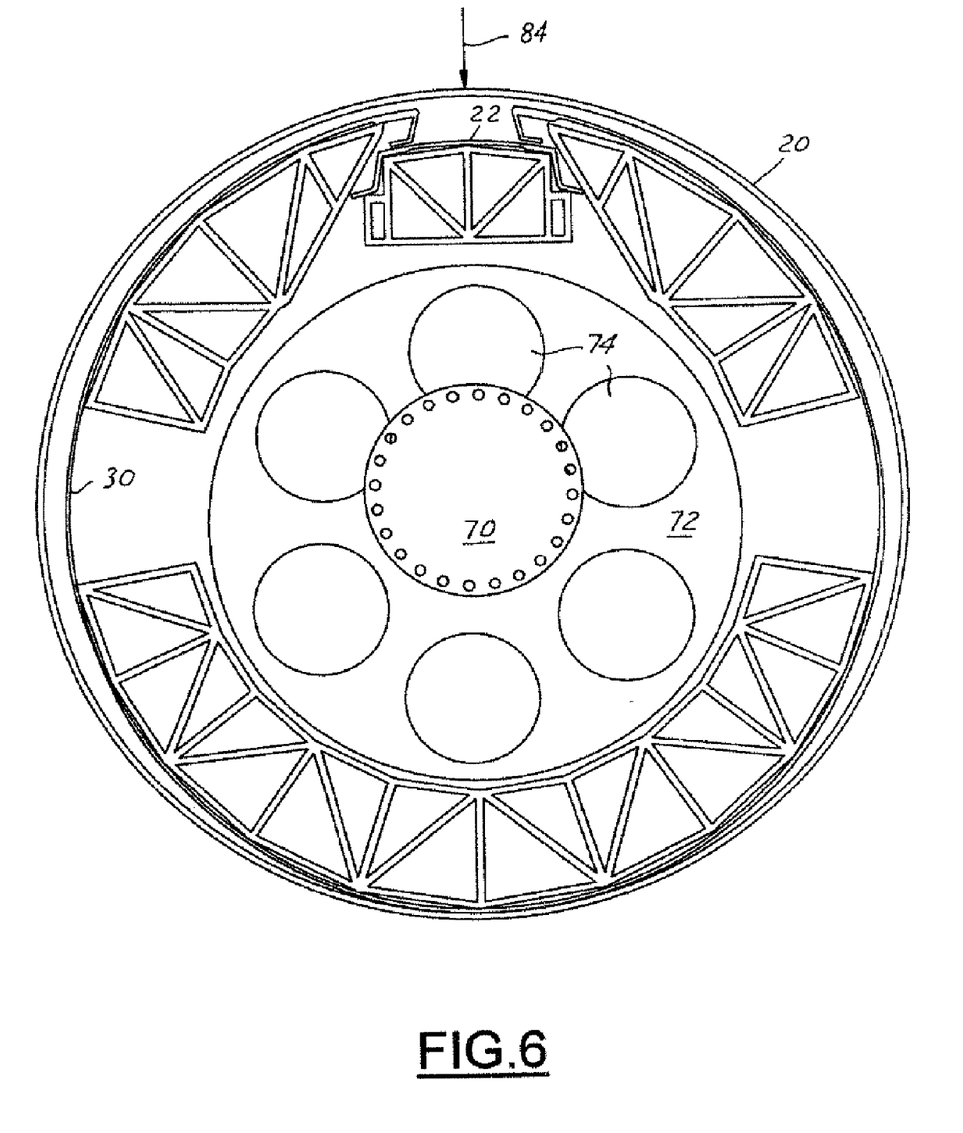
FIG. 6 is an illustration of the aircraft barrel lay-up assembly illustrated in FIG. 5, the composite ply assembly illustrated experiencing a downward squish force.
Figure 7:
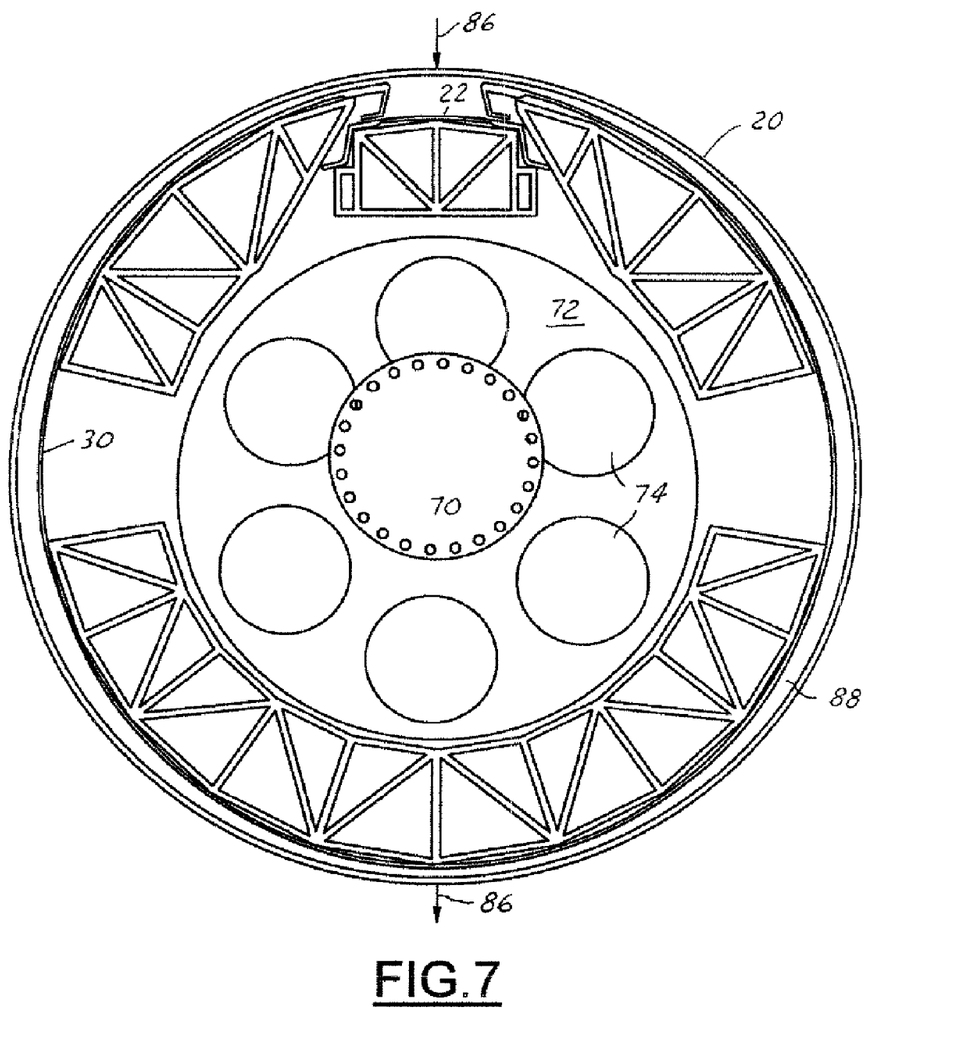
FIG. 7 an illustration of the aircraft barrel lay-up assembly illustrated in FIG. 6, the composite ply assembly illustrated having been moved to generate a continuous removal gap between the composite ply assembly and the barrel mandrel assembly.

It should be understood that after the major barrel outer surface element 30 is moved into the major barrel disengaged position 40 in order to generate the sliding gap 42 as shown in FIG. 5, further processing may be used to facilitate removal of the composite barrel element 20. A downward squish force 84 may be induced on the composite barrel element 20 to separate the sides from the barrel mandrel assembly 12 (FIG. 6). A subsequent generalized downward shift 86 (FIG. 7) of the composite barrel element 20 is used to generate a continuous removal gap 88 between the composite barrel element 20 and the barrel mandrel assembly 12. This allows for simple and non-intrusive removal after curing.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An aircraft barrel lay-up assembly comprising:
 a barrel mandrel assembly defining a contiguous outer barrel lay-up surface forming a barrel mandrel circumference, said barrel mandrel assembly comprising:
 a minor barrel outer surface element movable between a minor barrel engaged position and a minor barrel disengaged position, said minor barrel outer surface forming a minority portion of said contiguous outer barrel lay-up surface when in said minor barrel engaged position, said minor barrel outer surface moving out of continuity with said contiguous outer barrel lay-up surface when in said minor barrel disengaged position;
 a major barrel outer surface clement movable between a major barrel engaged position and a major barrel disengaged position, said major barrel outer surface element coincident with and forming a majority of said contiguous outer barrel lay-up surface when in said major barrel engaged position, said major barrel outer surface having a first major barrel surface end and a second major barrel surface end moving together to reduce an effective major barrel outer surface circumference when in said major barrel disengaged position, said major barrel outer surface element moving into said major barrel disengaged position in response to said minor barrel outer surface element moving into said minor barrel disengaged position; and
 a composite ply assembly fanned around said barrel mandrel circumference, said composite ply assembly cured while coincident with said contiguous outer barrel lay-up surface to form a composite barrel element, said composite barrel element removable from said barrel mandrel assembly by way of moving said minor barrel outer surface element into said minor barrel disengaged position and said major barrel outer surface element into said major barrel disengaged position such that a sliding gap is formed between said major barrel outer surface element and said composite ply assembly.

2. An aircraft barrel lay-up assembly as described in claim 1, further comprising:
a plurality of major barrel stiffener elements mounted to major barrel inner surface of said major barrel outer surface element; and
a first flex zone portion of said major barrel inner surface without said plurality of major barrel stiffener elements; and
a second flex zone portion of said major barrel inner surface without said plurality of major barrel stiffener elements, said first flex zone portion and said second flex zone portion allowing said major barrel outer surface element to be flexed between said major barrel engaged position and said major barrel disengaged position.

3. An aircraft barrel lay-up assembly as described in claim 1, further comprising:
a minor barrel stiffener element mounted to a minor barrel inner surface of said minor barrel outer surface element.

4. An aircraft barrel lay-up assembly as described in claim 1, wherein said minor barrel outer surface comprises less then twenty percent of said contiguous outer barrel lay up surface.

5. An aircraft barrel lay-up assembly as described in claim 2, wherein said plurality of major barrel stiffener elements comprise:
a base stiffener element extending from said first flex zone portion to said second flex zone portion;
a first upper stiffener element extending from said first flex zone portion to said first major barrel surface end;
a second upper stiffener element extending from said second flex zone portion to said second major barrel surface end.

6. An aircraft barrel lay-up assembly as described in claim 2, wherein said plurality of major barrel stiffener elements comprise a plurality of major barrel truss elements.

7. An aircraft barrel lay-up assembly as described in claim 3, wherein said minor barrel stiffener element comprises a minor barrel truss element.

8. An aircraft barrel lay-tip assembly as described in claim 1, further comprising:
a rotatable center support structure in supportive communication with said major barrel outer surface element, said rotatable center support structure including a rotational support mount coincident with a barrel mandrel center point such that said contiguous outer barrel lay-up surface may be rotated about said barrel mandrel center point.

9. An aircraft barrel lay-up assembly as described in claim 8, wherein said rotatable center support structure comprises a rotatable center support barrel including a plurality of air conducting chambers.

10. An aircraft barrel lay-up assembly as described in claim 5, further comprising:
a rotatable center support structure mounted to said base stiffener element, said rotatable center support structure including a rotational support mount coincident with a barrel mandrel center point such that said contiguous outer barrel lay-up surface may be rotated about said barrel mandrel center point.

11. An aircraft barrel lay-up assembly as described in claim 1, further comprising:
a first major barrel flange positioned at said first major barrel surface end;
a second major barrel flange positioned at said second major barrel surface end;
a first minor barrel flange positioned on said minor barrel outer surface element, said first minor barrel flange adapted to engage said first major barrel flange when in said minor barrel engaged position; and
a second minor barrel flange positioned on said minor barrel outer surface element, said second minor barrel flange adapted to engage said second major barrel flange when in said minor barrel engaged position.

12. An aircraft barrel lay-up assembly as described in claim 11, wherein said first major barrel flange and second major barrel flange comprise inwardly angled flanges.

13. An aircraft barrel lay-up assembly as described in claim 1, wherein said minor barrel outer surface element moves inwardly towards a barrel mandrel center point to move into said minor barrel disengaged position.

14. An aircraft barrel lay-up assembly as described in claim 11, wherein said first minor barrel flange and said second minor barrel flange engage said first major barrel flange and said second major barrel flange as said minor barrel outer surface element moves from said minor barrel disengaged position to said minor barrel engaged position, said minor barrel flanges forcing said major barrel flanges apart such that said effective major barrel outer surface circumference becomes coincident with said barrel mandrel circumference.

15. An aircraft barrel lay-up assembly as described in claim 14, wherein said major barrel outer surface element is biased towards said major barrel disengaged position.

16. An aircraft barrel lay-up assembly as described in claim 2, further comprising:
a minor barrel truss element mounted to a minor barrel inner surface of said minor barrel outer surface element.

17. An aircraft barrel lay-up assembly as described in claim 2, wherein said minor barrel outer surface comprises less than twenty percent of said contiguous outer barrel lay up surface.

18. An aircraft barrel lay-up assembly as described in claim 2, wherein said plurality of major barrel stiffener elements comprise:
a base truss element extending from said first flex zone portion to said second flex zone portion;
a first upper truss element extending from said first flex zone portion to said first major barrel surface end;
a second upper truss element extending from said second flex zone portion to said second major barrel surface end.

19. An aircraft barrel lay-up assembly as described in claim 2, further comprising:
a rotatable center support structure in supportive communication with said major barrel outer surface element, said rotatable center support structure including a rotational support mount coincident with a barrel mandrel center point such that said contiguous outer barrel lay-up surface may be rotated about said barrel mandrel center point.

20. An aircraft barrel lay-up assembly as described in claim 19, wherein said rotatable center support structure comprises a rotatable center support barrel including a plurality of air conducting chambers.

21. An aircraft barrel lay-up assembly as described in claim 18, further comprising:
a rotatable center support structure mounted to said base stiffener element, said rotatable center support structure including a rotational support mount coincident with a barrel mandrel center point such that said contiguous outer point.

22. An aircraft barrel lay-up assembly as described in claim 2, further comprising:
a first major barrel flange positioned at said first major barrel surface end; a second major barrel flange positioned at said second major barrel surface end;
a first minor barrel flange positioned on said minor barrel outer surface element, said first minor barrel flange adapted to engage said first major barrel flange when in said minor barrel engaged position; and
a second minor barrel flange positioned on said minor barrel outer surface element, said second minor barrel flange adapted to engage said second major barrel flange when in said minor barrel engaged position.

23. An aircraft barrel lay-up assembly as described in claim 2, wherein said minor barrel outer surface element moves inwardly towards a barrel mandrel center point to move into said minor barrel disengaged position.

24. An aircraft barrel lay-up assembly as described in claim 22, wherein said first minor barrel flange and said second minor barrel flange engage said first major barrel flange and said second major barrel flange as said minor barrel outer surface element moves from said minor barrel disengaged position to said minor barrel engaged position, said minor barrel flanges forcing said major barrel flanges apart such that effective major barrel outer surface circumference becomes coincident with said barrel mandrel circumference.

25. An aircraft barrel lay-up assembly as described in claim 24, wherein said major barrel outer surface element is biased towards said major barrel disengaged position.

26. A method of laying up an aircraft barrel assembly comprising:
laying up a composite ply assembly around a contiguous outer barrel lay-up surface of a barrel mandrel assembly, said barrel mandrel assembly comprising:
a minor barrel outer surface element movable between a minor barrel engaged position and a minor barrel disengaged position, said minor barrel outer surface forming a minority portion of said contiguous outer barrel lay-up surface when in said minor barrel engaged position, said minor barrel outer surface moving out of continuity with said contiguous outer barrel lay-up surface when in said minor barrel disengaged position;
a major barrel outer surface element movable between a major barrel engaged position and a major barrel disengaged position, said major barrel outer surface element coincident with and forming a majority of said contiguous outer barrel lay-up surface when in said major barrel engaged position, said major barrel outer surface having a first major barrel surface end and a second major barrel surface end moving together to reduce an effective major barrel outer surface circumference when in said major barrel disengaged position, said major barrel outer surface element moving into said major barrel disengaged position in response to said minor barrel outer surface element moving into said minor barrel disengaged position;
curing said composite ply assembly while said minor barrel outer surface element is in said minor barrel engaged position and said major barrel outer surface is in said major barrel engaged position such that a composite barrel element is generated;
moving said minor barrel outer surface element into said minor barrel disengaged position;
moving said major barrel outer surface element into said major barrel disengaged position such that a sliding gap is formed between said major barrel outer surface element and said composite barrel element; sliding said composite barrel element off of said barrel mandrel assembly.

27. A method as described in claim 26, further comprising:
mounting a plurality of major barrel stiffener elements onto a major barrel inner surface of said major barrel outer surface elements;
positioning said plurality of major barrel stiffener elements such that a first flex zone portion and a second flex zone portion of said major barrel inner surface are generated;
reducing said effective major barrel outer surface circumference by moving said first major barrel surface end and said second major barrel surface end closer together; and
moving said first major barrel surface end and said second major barrel surface end closer together by flexing said major barrel outer surface element at said first flex zone portion and said second flex zone portion.

28. A method as described in claim 27, wherein said plurality of major barrel stiffener elements comprise:
a base stiffener element extending from said first flex zone portion to said second flex zone portion;
a first upper stiffener element extending from said first flex zone portion to said first major barrel surface end;
a second upper stiffener element extending from said second flex zone portion to said second major barrel surface end.

29. A method as described in claim 28, further comprising:
mounting a rotatable center support structure to said base stiffener element, said rotatable center support structure including a rotational support mount coincident with a barrel mandrel center point;
rotating said barrel mandrel assembly about said barrel mandrel center point while laying up said composite ply assembly around said contiguous outer barrel lay-up surface.

30. A method as described in claim 26, further comprising:
moving said minor barrel outer surface element inwardly towards a barrel mandrel center point to move into said minor barrel disengaged position.

31. A method as described in claim 26 further comprising:
biasing said major barrel outer surface element towards said major barrel disengaged position.

32. A method as described in claim 26 further comprising:
biasing said minor barrel outer surface element towards said minor barrel engaged position.

33. A method as described in claim 26, further comprising:
moving said minor barrel outer surface element outward away from a barrel mandrel center point to move into said minor barrel engaged position;
engaging a first major barrel flange positioned on said first major barrel surface end with a first minor barrel flange positioned on said minor barrel outer surface element as said minor barrel outer surface element moves into said minor barrel engaged position;

engaging a second major barrel flange positioned on said second major barrel surface end with a second minor barrel flange positioned on said minor barrel outer surface element as said minor barrel outer surface element moves into said minor barrel engaged position;

pushing said first major barrel surface end apart from said second major barrel surface end using said first minor barrel flange and said second minor barrel flange such that said major barrel outer surface moves into said major barrel engaged position.

34. A method as described in claim 26 further comprising:
exerting a downward squish force on said composite barrel element to separate said composite barrel element from said major barrel outer surface element.

35. A method as described in claim 34 further comprising:
shifting said composite barrel element downwards to generate a continuous removal gap between said barrel mandrel assembly and said composite barrel element; and removing said composite barrel element from said barrel mandrel assembly.

36. A method of laying up an aircraft barrel assembly comprising:
laying up a composite ply assembly around a contiguous outer barrel lay-up surface of a barrel mandrel assembly, said barrel mandrel assembly comprising:
a minor barrel outer surface element movable between a minor barrel engaged position and a minor barrel disengaged position, said minor barrel outer surface forming a minority portion of said contiguous outer barrel lay-up surface when in said minor barrel engaged position, said minor barrel outer surface moving out of continuity with said contiguous outer barrel lay-up surface when in said minor barrel disengaged position;
a major barrel outer surface element movable between a major barrel engaged position and a major barrel disengaged position, said major barrel outer surface element coincident with and forming a majority of said contiguous outer barrel lay-up surface when in said major barrel engaged position, said major barrel outer surface having a first major barrel surface end and a second major barrel surface end moving together to reduce an effective major barrel outer surface circumference when in said major barrel disengaged position, said major barrel outer surface element moving into said major barrel disengaged position in response to said minor barrel outer surface element moving into said minor barrel disengaged position;
mounting a plurality of major barrel stiffener elements onto a major barrel inner surface of said major barrel outer surface elements;
positioning said plurality of major barrel stiffener elements such that a first flex zone portion and a second flex zone portion of said major barrel inner surface are generated;
curing said composite ply assembly while said minor barrel outer surface element is in said minor barrel engaged position and said major barrel outer surface is in said major barrel engaged position such that a composite barrel element is generated;
moving said minor barrel outer surface element into said minor barrel disengaged position by way of reducing said effective major barrel outer surface circumference by moving said first major barrel surface end and said second major barrel surface end closer together;
moving said first major barrel surface end and said second major barrel surface end closer together by flexing said major barrel outer surface element at said first flex zone portion and said second flex zone portion; moving said major barrel outer surface element into said major barrel disengaged position such that a sliding gap is formed between said major barrel outer surface element and said composite barrel element; sliding said composite barrel element off of said barrel mandrel assembly.

37. A method as described in claim 36, wherein said plurality of major barrel stiffener elements comprise:
a base stiffener element extending from said first flex zone portion to said second flex zone portion;
a first upper stiffener element extending from said first flex zone portion to said first major barrel surface end;
a second upper stiffener element extending from said second flex zone portion to said second major barrel surface end.

38. A method as described in claim 37, further comprising;
mounting a rotatable center support structure to said base stiffener element, said rotatable center support structure including a rotational support mount coincident with a barrel mandrel center point;
rotating said barrel mandrel assembly about said barrel mandrel center point while laying up said composite ply assembly around said contiguous outer barrel lay-up surface.

39. A method as described in claim 36, further comprising:
moving said minor barrel outer surface element inwardly towards a barrel mandrel center point to move into said minor barrel disengaged position.

40. A method as described in claim 36 further comprising:
biasing said major barrel outer surface element towards said major barrel disengaged position.

41. A method as described in claim 36, further comprising:
moving said minor barrel outer surface element outward away from a barrel mandrel center point to move into said minor barrel engaged position; engaging a first major barrel flange positioned on said first major barrel surface end with a first minor barrel flange positioned on said minor barrel outer surface element as said minor barrel outer surface element moves into said minor barrel engaged position;
engaging a second major barrel flange positioned on said second major barrel surface end with a second minor barrel flange positioned on said minor barrel outer surface element as said minor barrel outer surface element moves into said minor barrel engaged position;
pushing said first major barrel surface end apart from said second major barrel surface end using said first minor barrel flange and said second minor barrel flange such that said major barrel outer surface moves into said major barrel engaged position.

42. A method as described in claim 26 further comprising:
exerting a downward squish force on said composite barrel element to separate said composite barrel element from said major barrel outer surface element;
shifting said composite barrel element downwards to generate a continuous removal gap between said barrel mandrel assembly and said composite barrel clement; and
removing said composite barrel element from said barrel mandrel assembly.

* * * * *